United States Patent
Ren

(10) Patent No.: US 8,552,792 B1
(45) Date of Patent: Oct. 8, 2013

(54) SWITCH CIRCUIT AND ELECTRONIC DEVICE USING THE SAME

(75) Inventor: Dong-Liang Ren, Shenzhen (CN)

(73) Assignees: Hong Fu Jin Precision Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/597,235

(22) Filed: Aug. 28, 2012

(30) Foreign Application Priority Data

Mar. 29, 2012 (CN) .......................... 2012 1 0087309

(51) Int. Cl.
*H03K 17/687* (2006.01)
(52) U.S. Cl.
USPC ............ 327/434; 327/423; 327/482; 327/488
(58) Field of Classification Search
USPC .................................................. 327/365–508
See application file for complete search history.

(56) References Cited

U.S. PATENT DOCUMENTS

| | | | | |
|---|---|---|---|---|
| 3,870,905 A * | 3/1975 | Chikazawa | ................... | 327/474 |
| 5,719,519 A * | 2/1998 | Berringer | ...................... | 327/423 |
| 6,696,871 B2 * | 2/2004 | Bienvenu et al. | ............. | 327/134 |
| 8,261,105 B2 * | 9/2012 | Su et al. | ........................ | 713/300 |
| 2002/0079948 A1 * | 6/2002 | Moriconi et al. | ............. | 327/390 |
| 2002/0149415 A1 * | 10/2002 | Bienvenu et al. | ............. | 327/442 |
| 2006/0066385 A1 * | 3/2006 | Dodd et al. | ................... | 327/432 |
| 2010/0097119 A1 * | 4/2010 | Ma et al. | ...................... | 327/427 |

\* cited by examiner

*Primary Examiner* — Lincoln Donovan
*Assistant Examiner* — Brandon S Cole
(74) *Attorney, Agent, or Firm* — Altis & Wispro Law Group, Inc.

(57) ABSTRACT

A switch circuit and an electronic device using the same include a power switch transistor, a controlling circuit, a regulated capacitor, and a capacitor. The power switch transistor is connected between an input and an output of the switch circuit. An output of the controlling circuit is connected to a controlling electrode of the power switch transistor and outputs pulse width modulation (PWM) signals to turn the power switch transistor on and off. The regulated capacitor is connected between an output of the switch circuit and ground. The capacitor is connected between an output of the controlling circuit and ground for increasing an inclination of a rising edge and a falling edge of PWM signals to slow down the speed of switching the power switch transistor on and off, thereby making the regulated capacitor charge slowly and the output voltage of the switch circuit stable.

8 Claims, 2 Drawing Sheets

SWITCH CIRCUIT AND ELECTRONIC DEVICE USING THE SAME

BACKGROUND

1. Technical Field

The present disclosure relates to switch circuits and, particularly, to a switch circuit for reducing fluctuation of the output voltage of the switch circuit.

2. Description of Related Art

In a switch circuit of an electronic device, a regulated capacitor is connected between an output of the switch circuit and ground to stabilize the output voltage of the switch circuit. FIG. 1 illustrates a known switch circuit 10, which includes a power switch transistor 11, a controlling circuit 12, and a regulated capacitor 13. The power switch transistor 11 is a n-channel metal-oxide-semiconductor field-effect transistor (MOSFET) and connected between input 1 and output 2 of the switch circuit 10. A drain 4 of the power switch is connected to the input 1 of the switch circuit 10, a source 5 of the power switch is connected to the output 2 of the switch circuit 10, a gate (controlling electrode) 6 of the power switch transistor 11 is connected to output 3 of the controlling circuit 12. The controlling circuit 12 outputs pulse width modulation (PWM) signals to turn the power switch transistor 11 on and off and further to turn the switch circuit 10 on and off. The regulated capacitor 13 is connected between output 2 of the switch circuit 10 and ground to stabilize the output voltage of the switch circuit 10. However, at the moment when the power switch transistor 11 is turned on, the regulated capacitor 13 is charged first, thereby causing the output voltage of the switch circuit 10 to be less than the desired level.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout.

DETAILED DESCRIPTION

Figure 1:
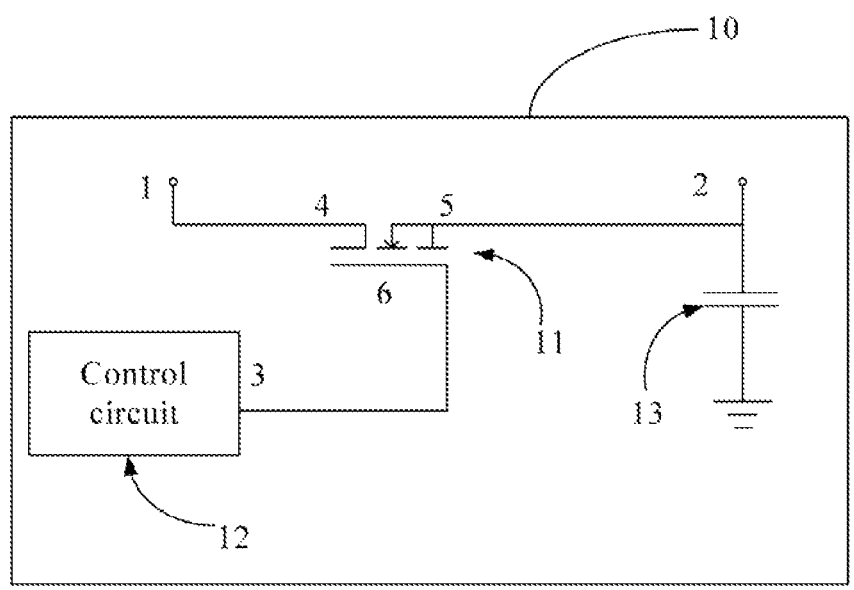
FIG. 1 is a circuit diagram of a conventional switch circuit.
Figure 2:
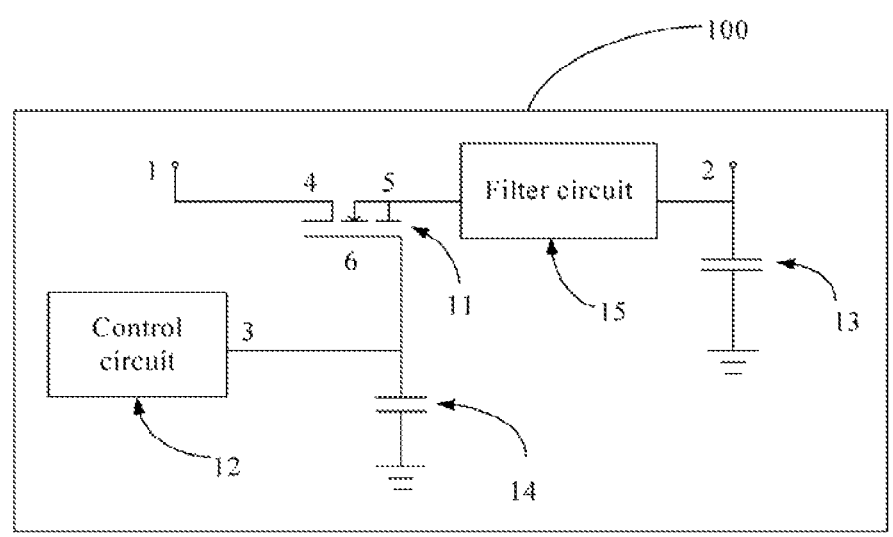
FIG. 2 is a circuit diagram of a switch circuit in accordance with an exemplary embodiment.

FIG. 2 illustrates a circuit diagram of a switch circuit 100 in accordance with an exemplary embodiment. Compared to the prior art, the switch circuit 100 further includes a capacitor 14. One end of the capacitor 14 is connected to the output 3 of the controlling circuit 12 and the controlling electrode 6 of the power switch transistor 11. The other end of the capacitor 14 is connected to ground. The capacitor 14 increases an inclination of a rising edge and a falling edge of PWM signals to slow down the speed of the power switch transistor 11 switching on and off, thereby the regulated capacitor 13 is charged slowly and the output voltage of the switch circuit 100 is stable.

In the embodiment, a filter circuit 15 connected between the power switch transistor 11 and the output 2 of the switch circuit 100 is for regulating the output voltage of the switch circuit 100.

In the embodiment, the power switch transistor 11 is a metal-oxide-semiconductor field-effect transistor (MOSFET), in other embodiments, the power switch transistor may be a bipolar junction transistor (BJT).

Although the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. A switch circuit comprising:
    a power switch transistor connected between an input and an output of the switch circuit;
    a controlling circuit outputting pulse width modulation controlling signals, wherein an output of the controlling circuit is directly connected to a control electrode of the power switch transistor;
    a filter circuit connected between the power switch transistor and the output of the switch circuit;
    a regulated capacitor, wherein a first end of the regulated capacitor is directly connected with an output of the filter circuit and the output of the switch circuit, and a second end of the regulated capacitor is grounded; and
    a capacitor, wherein a first end of the capacitor is directly connected with the output of the controlling circuit and the control electrode of the power switch transistor, and a second end of the capacitor is grounded.

2. The switch circuit as described in claim 1, wherein the power switch transistor is a n-channel metal-oxide-semiconductor field-effect transistor (MOSFET), a drain of the n-channel MOSFET is connected to the input of the switch circuit, a source of the n-channel MOSFET is connected to the output of the switch circuit, a gate of the n-channel MOSFET is connected to an output of the controlling circuit.

3. The switch circuit as described in claim 1, wherein the power switch transistor is a npn bipolar junction transistor (BJT), a collector of the npn BJT is connected to the input of the switch circuit, a emitter of the npn BJT is connected to the output of the switch circuit, a base of the npn BJT is connected to an output of the controlling circuit.

4. The switch circuit as described in claim 1, wherein the capacitor is used to increase an inclination of a rising edge and a falling edge of PWM signals outputted by the controlling circuit to slow down the speed of the power switch switching on and off.

5. An electronic device comprising:
    a switch circuit comprising:
        a power switch transistor connected between an input and an output of the switch circuit;
        a controlling circuit outputting pulse width modulation controlling signals, wherein an output of the controlling circuit is directly connected to a control electrode of the power switch transistor;
    a filter circuit connected between the power switch transistor and the output of the switch circuit;
        a regulated capacitor, wherein a first end of the regulated capacitor is directly connected with an output of the filter circuit and the output of the switch circuit, and a second end of the regulated capacitor is grounded; and
        a capacitor, wherein a first end of the capacitor is directly connected with the output of the controlling circuit and the control electrode of the power switch transistor, and a second end of the capacitor is grounded.

6. The electronic device as described in claim 5, wherein the power switch transistor is a n-channel MOSFET, a drain of the n-channel MOSFET is connected to the input of the switch circuit, a source of the n-channel MOSFET is connected to the output of the switch circuit, a gate of the n-channel MOSFET is connected to an output of the controlling circuit.

7. The electronic device as described in claim 5, wherein the power switch transistor is a npn bipolar junction transistor (BJT), a collector of the npn BJT is connected to the input of the switch circuit, a emitter of the npn BJT is connected to the output of the switch circuit, a base of the npn BJT is connected to an output of the controlling circuit.

8. The electronic device as described in claim 5, wherein the capacitor is used to increase an inclination of a rising edge and a falling edge of PWM signals outputted by the controlling circuit to slow down the speed of the power switch switching on and off.

* * * * *